(12) United States Patent
Henriksson et al.

(10) Patent No.: US 11,582,620 B2
(45) Date of Patent: Feb. 14, 2023

(54) APPARATUSES AND METHODS FOR CONFIGURATION INFORMATION RETRIEVAL

(71) Applicant: Telefonaktiebolaget LM Ericsson (publ), Stockholm (SE)

(72) Inventors: Daniel Henriksson, Linköping (SE); Tobias Ahlström, Ljungsbro (SE); Erik Eriksson, Linköping (SE); Peter Werner, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 721 days.

(21) Appl. No.: 16/474,363

(22) PCT Filed: Jun. 10, 2019

(86) PCT No.: PCT/SE2019/050535
§ 371 (c)(1),
(2) Date: Jun. 27, 2019

(87) PCT Pub. No.: WO2020/251427
PCT Pub. Date: Dec. 17, 2020

(65) Prior Publication Data
US 2021/0306871 A1 Sep. 30, 2021

(51) Int. Cl.
H04W 24/02 (2009.01)
H04W 76/16 (2018.01)
H04W 72/04 (2009.01)
H04W 88/18 (2009.01)
H04W 92/20 (2009.01)

(52) U.S. Cl.
CPC ....... H04W 24/02 (2013.01); H04W 72/0406 (2013.01); H04W 76/16 (2018.02); H04W 88/182 (2013.01); H04W 92/20 (2013.01)

(58) Field of Classification Search
CPC .............. H04W 24/02; H04W 76/16; H04W 72/0406; H04W 88/182; H04W 92/20
See application file for complete search history.

(56) References Cited

U.S. PATENT DOCUMENTS

2019/0254013 A1* 8/2019 Chang .................. H04L 5/00
2019/0320250 A1* 10/2019 Hoole ................ H04L 12/2801

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 14)" ("3GPP") (Year: 2017).*

(Continued)

*Primary Examiner* — Joshua L Schwartz
(74) *Attorney, Agent, or Firm* — Murphy, Bilak & Homiller, PLLC

(57) ABSTRACT

The present disclosure relates to radio network communication. In one of its aspects, the disclosure presented herein concerns a method for retrieving configuration information from a target Base Station (BS) in an E-UTRA New Radio-Dual Connectivity (EN-DC) wireless communication system. The method is performed by a source en-gNB. According to the method, a request message requesting configuration information from the target BS is transmitted to a first proxy evolved Node B (eNB). The request message comprises identifiers identifying the source en-gNB and the target BS, respectively.

9 Claims, 11 Drawing Sheets

(56) References Cited

OTHER PUBLICATIONS

Unknown, Author, "On X2 TNL Address Discovery for Option 3", 3GPP TSG-RAN Meeting #97bis, R3-173935, Ericsson, Prague, Czech Republic, Oct. 9-13, 2017, 10 pages.
Unknown, Author, "Support for TNL Address Information Discovery for En-Dc", 3GPP TSG-RAN WG3 Meeting #101 bix, R3-185840, Nokia, Chengdu, P.R. China, Oct. 8-12, 2018, 4 pages.
Unknown, Author, "TNL Address Discovery Based on Intermediate Node, for Option 3", 3GPP TSG-RAN WG3 AdHoc, R3-180223, Nokia, Sophia-Antipolis, France, Jan. 22-26, 2018, 2 pages.
Unknown, Author, "Updates on TS 36.423 for EN-DC TNL Address Discovery", 3GPP TSG-RAN WG3 Meeting #104, R3-193202, ZTE, Reno, US, May 13-17, 2019, 4 pages.
Unknown, Author, "Introducing X2 TNL Address discovery for en-gNBs for EN-DC", 3GPP TSG-RAN WG3 Meeting #101bis, R3-185914, Chengdu, P.R. China, Oct. 8-12, 2018, pp. 1-15.

\* cited by examiner

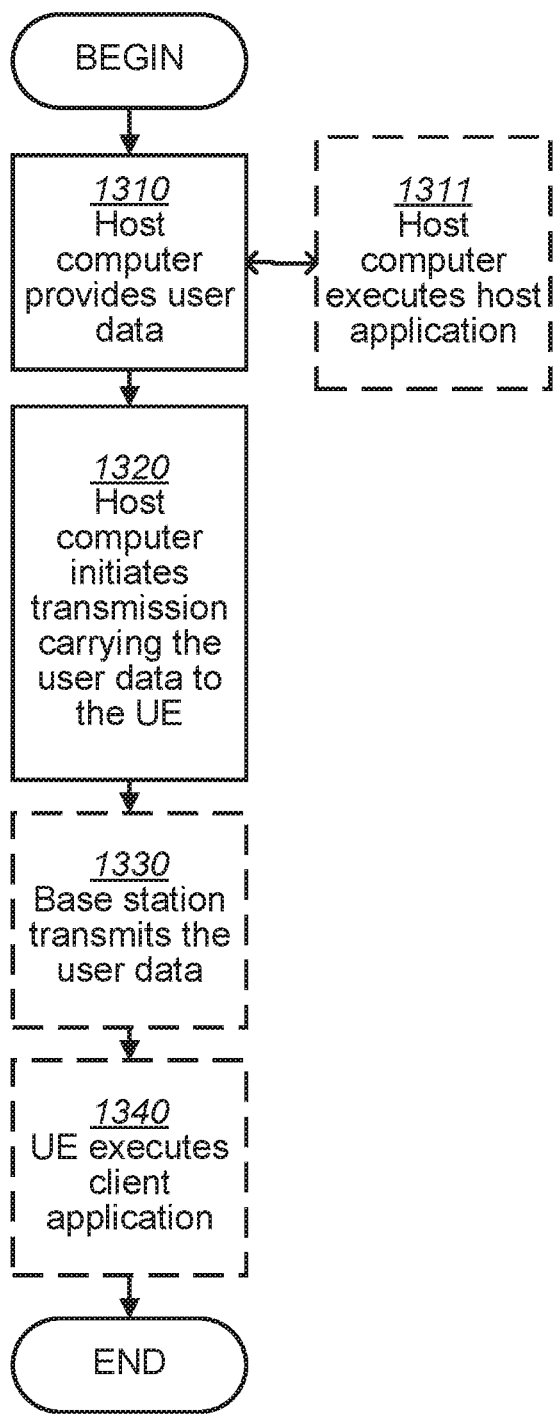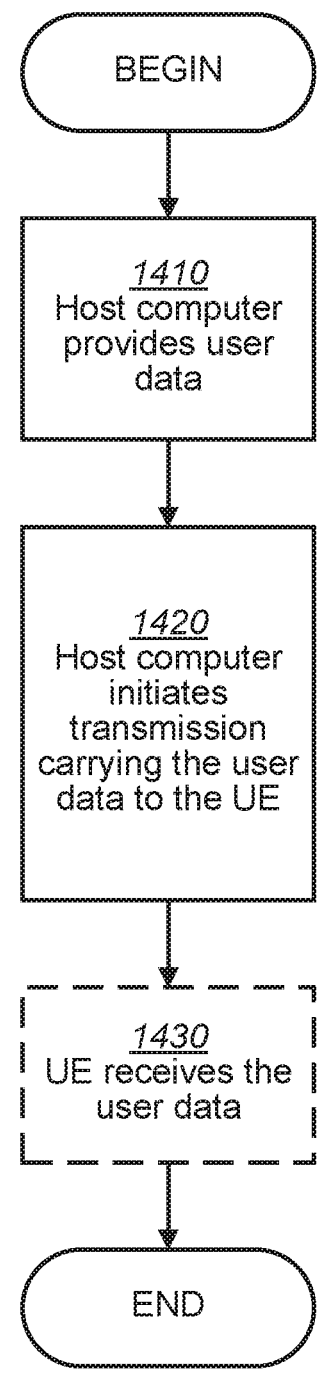
Fig. 13
Fig. 14

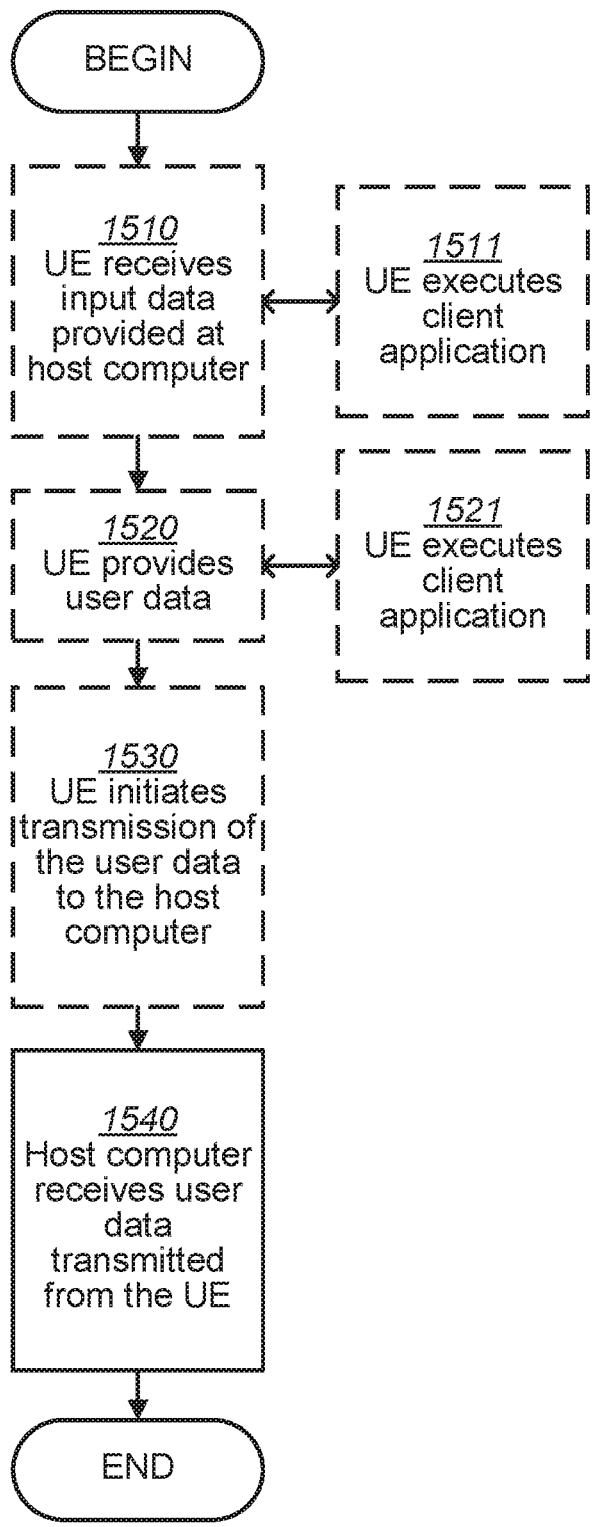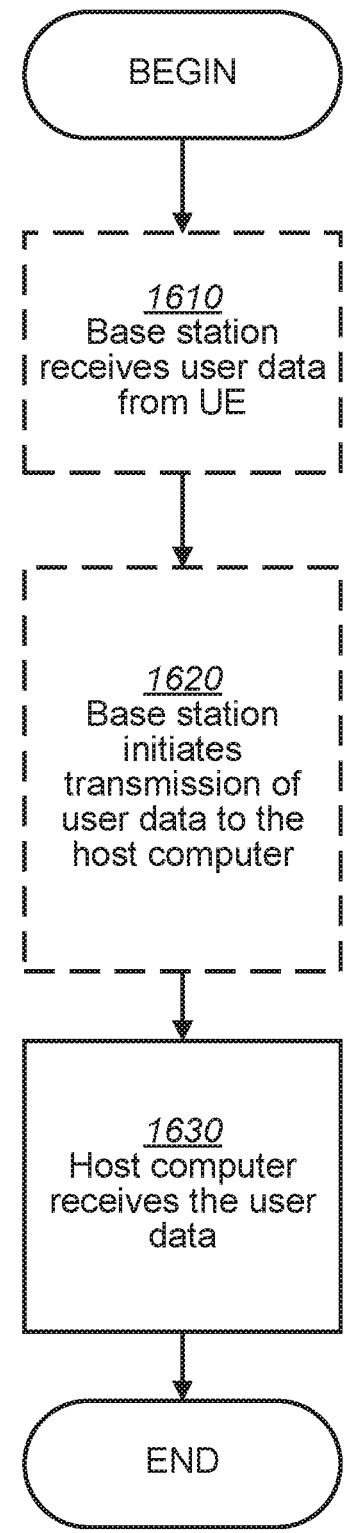
Fig. 15
Fig. 16

APPARATUSES AND METHODS FOR CONFIGURATION INFORMATION RETRIEVAL

TECHNICAL FIELD

The present disclosure generally relates to telecommunications. In particular, the various embodiments described in this disclosure relate to apparatuses and methods for retrieving configuration information from a target Base Station.

BACKGROUND

This section is intended to provide a background to the various embodiments of the invention that are described in this disclosure. Therefore, unless otherwise indicated herein, what is described in this section should not be interpreted to be prior art by its mere inclusion in this section.

The concept of Dual Connectivity (DC) was introduced in Long Term Evolution (LTE) to allow a UE to simultaneously transmit and receive data on multiple component carriers from two cell groups via two Base Stations (BS), i.e. a Master eNodeB (MeNB) and a Secondary eNB (SeNB). The UE may communicate simultaneously with both the MeNB and the SeNB, which allows the communication system to increase the total bandwidth of communications to and from the UE.

Traditionally, a UE is connected to one Radio Access Technology (RAT) at a time, i.e. either connected to Global System for Mobile communications (GSM), or to Universal Mobile Telecommunications System (UMTS) or to LTE. With the introduction of 5G, this is changed. Due to, inter alia, the higher frequencies bands used it was deemed better to enable UEs to connect to LTE and New Radio (NR) simultaneously. This is referred to as Dual Connectivity EN-DC. EN-DC stands for E-UTRAN (i.e. Evolved Universal Mobile Telecommunications System (UMTS) Terrestrial Radio Access) New Radio-Dual Connectivity. With the NR rollouts beginning, NR is used side-by-side with LTE, i.e. Non-Stand-Alone (NSA).

FIG. 1 illustrates an example of an EN-DC wireless communication system 900, which is in accordance with the Radio Access Network (RAN) architecture option 3 in Release 15. The en-gNB 3 is connected to the eNB 4 via an X2 interface. The eNB 4 is the master node that carries the control plane and the gNB 3 is the secondary node which carries the user plane part only. One eNB 4 may connect to multiple en-gNBs and one en-gNB 3 may be connected to multiple eNBs. Both the en-gNB 3 and the eNB 4 have direct interface with the LTE core network, the Evolved Packet Core (EPC) 8, via the S1-U interface. However, in case of control plane only the eNB 4 has direct interface with the LTE core network, via the S1-C interface. Thus, the eNB 4 is responsible for maintaining the connection state transitions, handling the connection setup/release, and initiating the first-time secondary node addition, that is, the EN-DC setup.

In order for one BS, i.e. a source BS, to connect to another BS, i.e. a target BS, via an X2 interface, the source BS has to know the ID of the target BS. Furthermore, the source BS has to determine the TNL address suitable for establishing the connection. This TNL address may be received from the Mobile Management Entity (MME). Traditionally, the MME relay neighbouring cell relay requests from a source eNB to a target eNB so that X2 connection and eNB neighbouring cell relation table can be automatically updated in both eNBs. This MME supporting role is known as TNL address discovery of candidate eNB via S1 interface of Configuration Transfer Procedure. However, due to the introduction of EN-DC wireless communication system, this process had to be further developed.

SUMMARY

At the RAN3 NR AH 1807 meeting, Montreal, July 2018, the following working assumptions were established:
1. WA Specifications needs to enable routing of TNL address requests at MME for TNL address discovery of Opt 3 in Rel-15
2. WA We use a protocol fn of S1 equivalent to current functionality (e.g. S1 TNL config transfer procedure to start TNL address discovery)
3. WA Routing function of TNL address requests resides in the MME: further details are FFS.

The 3GPP contribution R3-185914, "Introducing X2 TNL Address discovery for en-gNBs for EN-DC", Ericsson, Vodafone, RAN3 #101bis, Chengdu, October 2018, builds upon these working assumptions and describes the overall method resulting from those. The 3GPP contribution R3-185914 introduces X2 TNL Address discovery for en-gNBs for EN-DC. This is now going to be described with reference to FIG. 2. FIG. 2 illustrates the overall approach for X2 TNL Address discovery for the Radio Access Network architecture Option 3 in Release 15.

As seen in FIG. 2, in step a, an en-gNB 30 is assumed to be configured with at least one X2-C TNL address of an eNB 40 with which it is supposed to interact in terms of EN-DC. It can be assumed that many deployment scenarios would foresee co-location of those nodes. In step b, X2 is set up between the en-gNB 30 and the eNB 40. Thereafter, following the working assumptions #1 and #3 described above, the eNB 40 to which en-gNB 30 has established X2-C connectivity announces this fact to the MME(s) 80 it is connected to. In step d, the MME 80 updates its lookup table with the information that the en-gNB 30 is X2-connected with the eNB 40. Thus, the starting point of the X2 TNL address discovery for option 3 is based on a routing entry in the MME's lookup table that is able to redirect TNL address requests to an eNB 40 the en-gNB 30 is connected to.

X2 TNL address discovery for option 3 is described with the following steps. At step 11, a User Equipment (UE) served by eNB 60 detects an NR cell which is yet unknown to eNB 60 and performs Cell Global Identity (CGI) reporting. At step 12, eNB 60 deduces the ID of the serving en-gNB 30 from the reported NR cell ID. TNL address discovery is started by eNB 60 at step 13 by indicating "X2 TNL Configuration Info" in the SON Information Request IE and provides routing information, i.e. the source eNB ID and the target en-gNB ID. The approach depicted in FIG. 2 suggests reusing existing S1AP procedures. At step 14, the MME 80 consults its routing table to direct the request to eNB 40, in accordance with working assumptions #1 and #2 previously described. The request is thereafter, at step 15, forwarded to eNB 40. The MME Configuration Transfer is suggested to contain source eNB 60 and target en-gNB 30 as routing information. An implementation choice may foresee to provide X2-C TNL address information without consulting the en-gNB 30, if such information is available at eNB 40. If the en-gNB 30 is consulted, eNB 40 requests X2-C TNL address information from en-gNB 30 by indicating the requesting eNB's ID. The X2 TNL address information is provided to eNB 60 at steps 17 and 18, and X2 is setup between en-gNB 30 and eNB 60 at step 19. At step 20 and 21, as an implementation choice, e.g. gain resilience against S1/X2 connectivity outages, eNB 60 may update the look-up table at the MME 80 by initiating the eNB Configuration Update procedure. The MME 80 would then have the choice to provide a further request for X2-C TNL address to either eNB 40 or eNB 60.

As noted, in R3-185914 it is only described that an eNB can initiate the configuration transfer message in order to later retrieve the TNL-address information for X2 setup. However, in EN-DC there will also be a need for establishment of X2 connection between an en-gNB and another en-gNB, for example used for data forwarding. Furthermore, there may also be situations when an en-gNB wants to establish an X2 connection towards an eNB in which it has discovered an LTE cell. Accordingly, there is a need for a solution that enables an en-gNB to retrieve configuration information from a target BS in an EN-DC wireless communication system.

It is in view of the above background and other considerations that the various embodiments of the present disclosure have been made.

It is proposed to provide a solution to address this problem, i.e. enabling an en-gNB to retrieve configuration information from a target BS in an EN-DC wireless communication system, by adding identifiers that identify the source en-gNB and the target BS, respectively.

This general object has been addressed by the appended independent claims. Advantageous embodiments are defined in the appended dependent claims.

According to a first aspect, there is provided a method for retrieving configuration information from a target Base Station (BS) in an E-UTRA New Radio-Dual Connectivity (EN-DC) wireless communication system. The method is performed by a source en-gNB.

The method comprises transmitting, to a first proxy evolved Node B (eNB) a request message requesting configuration information from the target BS. The request message comprises identifiers identifying the source en-gNB and the target BS, respectively.

In some embodiments, the request message is transmitted in an EN-DC Configuration Transfer Request message.

In some embodiments, the method further comprises receiving, from the first proxy eNB, a response message comprising the requested configuration information. For example, the response message comprising the requested configuration information may be received in an EN-DC Configuration Transfer Response message. The method may further comprise initiating an X2 setup with the target BS by using the received configuration information.

In some embodiments, the configuration information comprises X2 Transport Network Layer (TNL) information.

In some embodiments, the step of transmitting a request message requesting configuration information from the target BS is preceded by that the method further comprises receiving a Physical Cell Identity (PCI) reported by a wireless device. A request to perform Cell Global Identity (CGI) reporting is transmitted to the wireless device. The requested CGI is received from the wireless device, and an identifier identifying the target BS is deduced from the received CGI. The reported PCI may be received from the wireless device directly or via the first proxy eNB.

According to a second aspect, there is provided a method for retrieving configuration information from a target BS to a source en-gNB (300) in an EN-DC wireless communication system. The method is performed by a first proxy eNB.

The method comprises receiving, from the source en-gNB, a request message requesting configuration information from the target BS. The request message comprises identifiers that identifies the source en-gNB and the target BS (500), respectively.

In some embodiments, the received request message is received in an EN-DC Configuration Transfer Request message.

In some embodiments, the method further comprises forwarding, to a Mobile Management Entity (MME), the received request message requesting configuration information. The method further comprises receiving, from the MME, the requested configuration information. For example, the method further comprises forwarding, to the source en-gNB, the received configuration information. The received configuration information may be forwarded to the source en-gNB in an EN-DC Configuration Transfer Response message.

In some embodiments, the configuration information comprises X2 TNL information.

According to a third aspect, there is provided a source en-gNB configured to perform the method according to the first aspect.

The source en-gNB is configured for retrieving configuration information from a target BS in an EN-DC wireless communication system. The source en-gNB comprises a processing circuitry and a memory circuitry. The memory circuit stores computer program code which, when run in the processing circuitry, causes the source en-gNB to transmit, to a first proxy eNB, a request message requesting configuration information from the target BS. The request message comprises identifiers identifying the source en-gNB and the target BS, respectively.

In some embodiments, the request message is transmitted in an EN-DC Configuration Transfer Request message.

In some embodiments, the memory circuitry storing computer program code which, when run in the processing circuitry, further causes the source en-gNB to receive, from the first proxy eNB, a response message comprising the requested configuration information. For example, the response message comprising the requested configuration information is received in an EN-DC Configuration Transfer Response message. The memory circuitry storing computer program code which, when run in the processing circuitry, may further cause the source en-gNB initiate an X2 setup with the target BS by using the received configuration information.

In some embodiments, the configuration information comprises X2 TNL information.

In some embodiments, the memory circuitry storing computer program code which, when run in the processing circuitry, further causes the source en-gNB to receive a PCI reported by a wireless device and to transmit, to the wireless device, a request to perform CGI reporting. The requested CGI is received from the wireless device and an identifier identifying the target BS is deducted from the received CGI. The reported PCI may be received from the wireless device directly or via the first proxy eNB.

According to a fourth aspect, there is provided a first proxy eNB configured to perform the method according to the second aspect.

The first proxy eNB is configured for retrieving configuration information from a target BS to a source en-gNB in an EN-DC wireless communication system. The first proxy eNB comprises a processing circuitry and a memory circuitry. The memory circuit stores computer program code which, when run in the processing circuitry, causes the first proxy eNB to receive, from the source en-gNB, a request message requesting configuration information from the target BS. The request message comprises identifiers that identifies the source en-gNB and the target BS, respectively.

In some embodiments, the received request is transmitted in an EN-DC Configuration Transfer Request message.

In some embodiments, the memory circuitry storing computer program code which, when run in the processing circuitry, further causes the first proxy eNB to forward, to a MME, the received request message requesting configuration information and receive, from the MME, the requested configuration information. The memory circuitry storing computer program code which, when run in the processing circuitry, may further cause the first proxy eNB to forward, to the source en-gNB, the received configuration information. The received configuration information may be forwarded to the source en-gNB in an EN-DC Configuration Transfer Response message.

In some embodiments, the configuration information comprises X2 TNL information.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a solution for retrieving configuration information from a target BS to a source en-gNB in multi-RAT and multi-vendor deployment scenarios.

BRIEF DESCRIPTION OF THE DRAWINGS

These and other aspects, features and advantages will be apparent and elucidated from the following description of various embodiments, reference being made to the accompanying drawings, wherein:

FIG. 13 shows an example method implemented in a communication system including a host computer, a base station and a user equipment;

FIG. 14 illustrates an example method implemented in a communication system including a host computer, a base station and a user equipment; and FIGS. 15 and 16 show example methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method for retrieving configuration information from a target Base Station (BS) in an E-UTRA New Radio-Dual Connectivity (EN-DC) wireless communication system.

Figure 3:
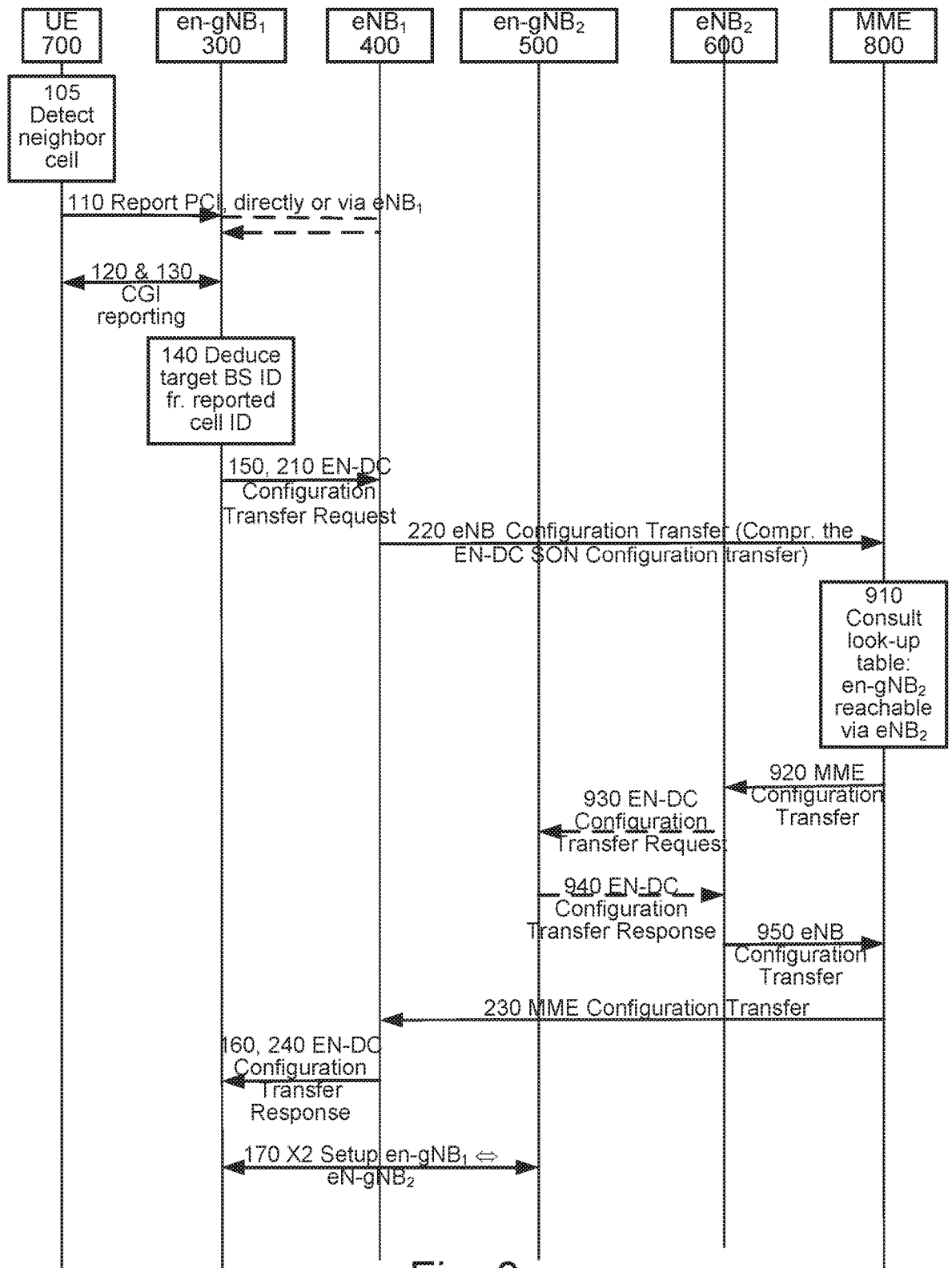
FIG. 3 illustrates a message sequence chart of a process for retrieving configuration information from a target BS in an EN-DC wireless communication system.
Figure 4:
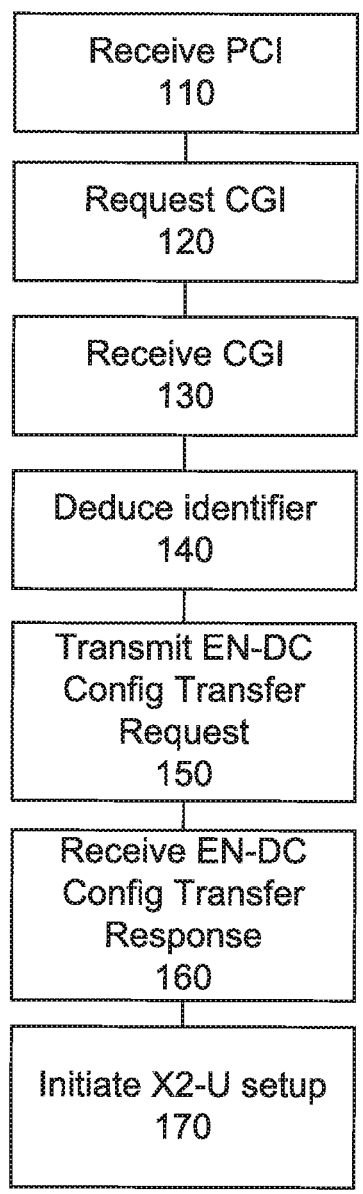
FIG. 4 is a flowchart of an example method performed by a source en-gNB.

With reference to the FIGS. 3 and 4, a first embodiment will now be described. FIG. 3 illustrates a message sequence chart of a process for retrieving configuration information from a target BS in an EN-DC wireless communication system. FIG. 4 illustrates a method 100, performed by a source en-gNB, for retrieving configuration information from a target BS in an EN-DC wireless communication system. The target BS is the BS that the en-gNB, i.e. the source en-gNB 300, wants to retrieve information from. In one embodiment, the target BS may be an eNB 600. In another embodiment, the target BS may be an en-gNB 500.

The method 100 starts at step 150 with the source en-gNB 300 transmitting, to a first proxy evolved NodeB (eNB) 400, a request message requesting configuration information from the target BS 500.600. The request message comprises identifiers identifying the source en-gNB 300 and the target BS 500,600, respectively. The first proxy eNB 400 is thus an eNB that functions as a proxy between the source en-gNB 300 and the MME 800.

The proposed method 100 uses the previously described request message to identify both the source en-gNB 300 and the target BS 500,600. By adding identifiers that identify both the source BS, i.e. the source en-gNB 300, and the target BS 500,600, it is possible for an en-gNB to initiate the method of retrieving configuration information from a target BS. Accordingly, it is possible for a source en-gNB 300 to retrieve configuration information from a target BS 500,600 even though the source en-gNB 300 may have to request the information through a proxy eNB 400.

In some embodiments, the configuration information may comprise X2 Transport Network Layer (TNL) information.

In some embodiments, the request message may be transmitted in an EN-DC Configuration Transfer Request message. Accordingly, the proposed method 100 may use existing framework to implement a solution whereby it is made possible for an en-gNB 300 to retrieve configuration information from a target BS 500,600 in an EN-DC wireless communication system. The existing framework is used by using an existing message, such as the EN-DC Configuration Transfer Request message. The EN-DC Configuration Transfer Request message is specified in section 9.1.2.x1 in R3-185914.

The EN-DC Configuration Transfer Request message may thus be sent by an eNB or an en-gNB to request EN-DC related X2 configuration information from either an en-gNB or an eNB. The EN-DC Configuration Transfer Request message would accordingly be defined as specified in Table 1.

TABLE 1

EN-DC Configuration Transfer Request

| IE/Group Name | Presence | Range | IE type and reference | Semantics description | Criticality | Assigned Criticality |
|---|---|---|---|---|---|---|
| Message Type | M | | 9.2.13 | | YES | reject |
| >CHOICE Source Node ID | M | | | | | |
| >>Source eNB-ID | | | | | | |
| >>Source gNB-ID | | | | | | |
| >CHOICE Target Node ID | O | | | Present if en-gNB is trying to retrieve X2 or X2-U endpoint info from another en-gNB or eNB | | |
| >>Target eNB-ID | | | | | | |
| >>Target gNB-ID | | | | | | |
| Source eNB X2 TNL Configuration Info | | | X2 TNL Configuration Info 9.2.y2 | | YES | reject |

It should be noted that the name of the last IE in the EN-DC Configuration Transfer Request message, specified in Table 1, may be changed. In the existing message, the IE is named "Source eNB X2 TNL Configuration Info", but it may be realised that in accordance with the present disclosure, the EN-DC Configuration Transfer Request message may be sent by an eNB or an en-gNB to request EN-DC related X2 configuration information from either an en-gNB or an eNB. Accordingly, the IE may also comprise configuration information related to the en-gNB. Thus, the IE may e.g. be named "Source Node X2 TNL Configuration Info".

In some embodiments, the method 100 may further comprise the step 160 of receiving, from the first proxy eNB 400, a response message comprising the requested configuration information. The response message comprising the requested configuration information may be received in an EN-DC Configuration Transfer Response message. Accordingly, the proposed method 100 may use existing framework to implement a solution whereby it may be possible for the en-gNB to retrieve the configuration information from the target BS by using an existing message, such as the EN-DC Configuration Transfer Response message. The EN-DC Configuration Transfer Response message is specified in section 9.1.2.x2 in R3-185914. This message may thus be sent by an eNB or an en-gNB to provide EN-DC related X2 configuration information requested by an eNB or an en-gNB. The EN-DC Configuration Transfer Response message would accordingly be defined as specified in Table 2.

TABLE 2

EN-DC Configuration Transfer Response

| IE/Group Name | Presence | Range | IE type and reference | Semantics description | Criticality | Assigned Criticality |
|---|---|---|---|---|---|---|
| Message Type | M | | 9.2.13 | | YES | reject |
| Source en-gNB X2 TNL Configuration Info | | | X2 TNL Configuration Info 9.2.y2 | | YES | ignore |

In some embodiments, when the source en-gNB 300 has received the requested configuration information, the method 100 may further comprise the step 170 of initiating an X2 setup with the target BS 500,600 by using this received configuration information.

The proposed method thus provides a solution for an en-gNB 300 to establish X2-U with another en-gNB 500. In addition to this, the proposed method also provides a solution for initiating an X2-connection from an en-gNB 300 to an eNB 600.

In some embodiments, the method 100 may further comprise steps 110-150 that may precede step 150, wherein step 150 comprises transmitting a request message requesting configuration information from the target BS 500,600. Steps 110-150 are described with reference to FIGS. 3 and 4. At step 110, a Physical Cell Identity (PCI) reported by a wireless device 700 may be received. The wireless device 700 may, for example, be an EN-DC UE that is connected to both a LTE cell and a NR cell. The wireless device 700 may detect an unknown NR or LTE neighbor cell at step 105 and report the PCI to the en-gNB 300 at step 110. The reported PCI may be received from the wireless device 700 directly or via the first proxy eNB 400. At step 120, a request to perform Cell Global Identity (CGI) reporting may be transmitted to the wireless device 700. The requested CGI may be received from the wireless device 700 at step 130. At step 140, an identifier identifying the target BS 500,600 may be deduced from the received CGI.

According to a second aspect, there is provided a method, performed by a first proxy eNB for retrieving configuration information from a target BS to a source en-gNB in an EN-DC wireless communication system. The target BS may, for example, be an eNB 600 or an en-gNB 500.

Figure 5:
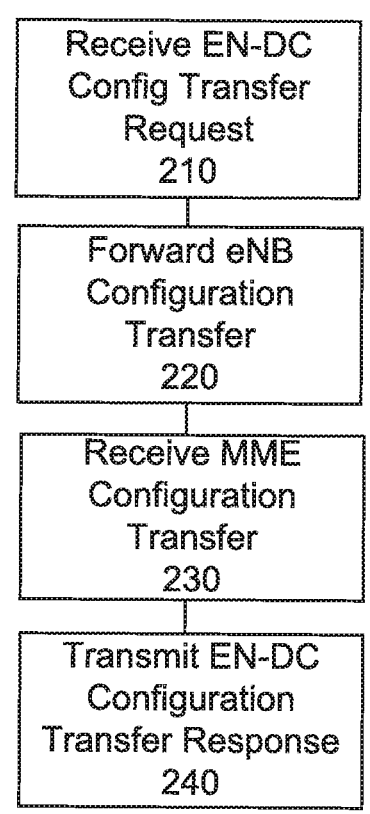
FIG. 5 is a flowchart of an example method performed by a first proxy eNB.

The method 200 is now going to be described with reference to the FIGS. 3 and 5. As previously mentioned, FIG. 3 illustrates a message sequence chart of a process for retrieving configuration information from a target BS 500, 600 to a source en-gNB 300 in an EN-DC wireless communication system 900. FIG. 5 illustrates the method 200, performed by the first proxy eNB 400, for retrieving configuration information from the target BS 500,600 to the source en-gNB 300 in the EN-DC wireless communication system 900.

The method 200 starts at step 210 with receiving, from the source en-gNB 300, a request message requesting configuration information from the target BS 500,600. The request message comprises identifiers that identifies the source en-gNB 300 and the target BS 500,600, respectively.

The proposed method 200 uses the request message for retrieving configuration information from a target BS 500, 600 to identify both the source en-gNB 300 and the target BS 500,600. By adding the identifiers that identify both the source BS, i.e. the source en-gNB 300, and the target BS 500,600 it is possible for an en-gNB 300 to initiate the method of retrieving configuration information from a target BS 500,600.

In some embodiments, the configuration information may comprise X2 Transport Network Layer (TNL) information.

In some embodiments, the request message may be transmitted in an EN-DC Configuration Transfer Request message. Accordingly, the proposed method 200 may use existing framework to implement a solution whereby it may be possible for a proxy eNB 400 to enable that an en-gNB 300 can retrieve configuration information from a target BS 500.600 in an EN-DC wireless communication system 900 by using an existing message, such as the EN-DC Configuration Transfer Request message. The EN-DC Configuration Transfer Request message is specified in section 9.1.2.x1 in R3-185914. This message may thus be received by the proxy eNB 400 from the source en-gNB 300. The EN-DC Configuration Transfer Request message would accordingly be defined as specified in Table 1 above.

In some embodiments, the method 200 may further comprise the step 220 of forwarding, to a Mobile Management Entity (MME) 800 the received request message requesting configuration information. The requested configuration information may thereafter be received, in step 230, from the MME 800.

In some embodiments, the forwarded request message may comprise an EN-DC SON Configuration Transfer IE. Accordingly, the proposed method 200 may use existing framework to implement a solution whereby it may be possible for a proxy eNB 400 to forward a request comprising all necessary information such that an en-gNB 300 can retrieve configuration information from a target BS 500,600 in an EN-DC wireless communication system 900 by using an existing IE, such as an EN-DC SON Configuration Transfer. The EN-DC SON Configuration Transfer IE is specified in section 9.2.3.26a in R3-185914. This IE comprises the configuration information, used by Self-Organizing Network (SON) functionality for EN-DC, and additionally includes identifiers of the destination (target) node and the source node of this configuration information. The EN-DC SON Configuration Transfer JE would accordingly be defined as specified in Table 3.

TABLE 3

| EN-DC SON Configuration Transfer | | | | |
|---|---|---|---|---|
| IE/Group Name | Presence | Range | IE type and reference | Semantics description |
| EN-DC SON Configuration Transfer | | | | |
| >CHOICE Transfer Type | M | | | |
| >>Request | | | | NOTE: Used if the SON Information IE indicates a request. |
| >>>Source eNB-ID | | | | |
| >>>>Global eNB ID | M | | 9.2.1.37 | |
| >>>>Selected TAI | M | | TAI 9.2.3.16 | |
| >>> Choice Target Node ID | M | | | |
| >>>>Target eNB-ID | | | | |
| >>>>>Global eNB ID | M | | 9.2.1.37 | |
| >>>>>Selected TAI | M | | TAI 9.2.3.16 | |
| >>>Target en-gNB-ID | | | | |
| >>>>>Global en-gNB ID | M | | 9.2.1.37a | |
| >>>>>Selected TAI | M | | TAI 9.2.3.16 | NOTE: The Selected TAI contains a configured TAC of the en-gNB. |
| >>>Source en-gNB-ID | | | | |
| >>>>Global en-gNB ID | O | | 9.2.1.37a | |
| >>>>Selected TAI | O | | TAI 9.2.3.16 | NOTE: The Selected TAI contains a configured TAC of the en-gNB. |
| >>Reply | | | | NOTE: Used if the SON Information IE indicates a reply. |
| >>>Choice Source Node ID | M | | | |
| >>>>Source eNB-ID | | | | |
| >>>>>Global eNB ID | M | | 9.2.1.37 | |
| >>>>>Selected TAI | M | | TAI 9.2.3.16 | |
| >>>>Source en-gNB-ID | | | | |
| >>>>>Global en-gNB ID | M | | 9.2.1.37a | |
| >>>>>Selected TAI | M | | TAI 9.2.3.16 | NOTE: The Selected TAI contains a configured TAC of the en-gNB. |

TABLE 3-continued

EN-DC SON Configuration Transfer

| IE/Group Name | Presence | Range | IE type and reference | Semantics description |
|---|---|---|---|---|
| >>>Target eNB-ID | | | | |
| >>>>Global eNB ID | M | | 9.2.1.37 | |
| >>>>Selected TAI | M | | TAI 9.2.3.16 | |
| >>>Target en-gNB-ID | | | | |
| >>>>Global en-gNB ID | O | | 9.2.1.37a | |
| >>>>Selected TAI | O | | TAI 9.2.3.16 | NOTE: The Selected TAI contains a configured TAC of the en-gNB. |
| >SON Information | M | | 9.2.3.27 | |
| >X2 TNL Configuration Info | C-ifSONInformation Request | | 9.2.3.29 | Source eNB X2 TNL Configuration Info. |

In some embodiments, the method 200 may further comprise the step 240 of forwarding, to the source en-gNB 300, the received configuration information. The received configuration information may, for example, be forwarded to the source en-gNB 300 in an EN-DC Configuration Transfer Response message, as specified in Table 2 above. Thus, the proposed method 200 may use existing frame work to implement a solution whereby it may be possible for the proxy eNB 400 to forward information such that it can be enabled that an en-gNB can retrieve configuration information from a target BS 500,600 in an EN-DC wireless communication system 900. The configuration information may, for example, comprise X2 TNL information. This information may be used by the source en-gNB 300 to initiate X2 connection with a target BS 500,600.

Figure 2:
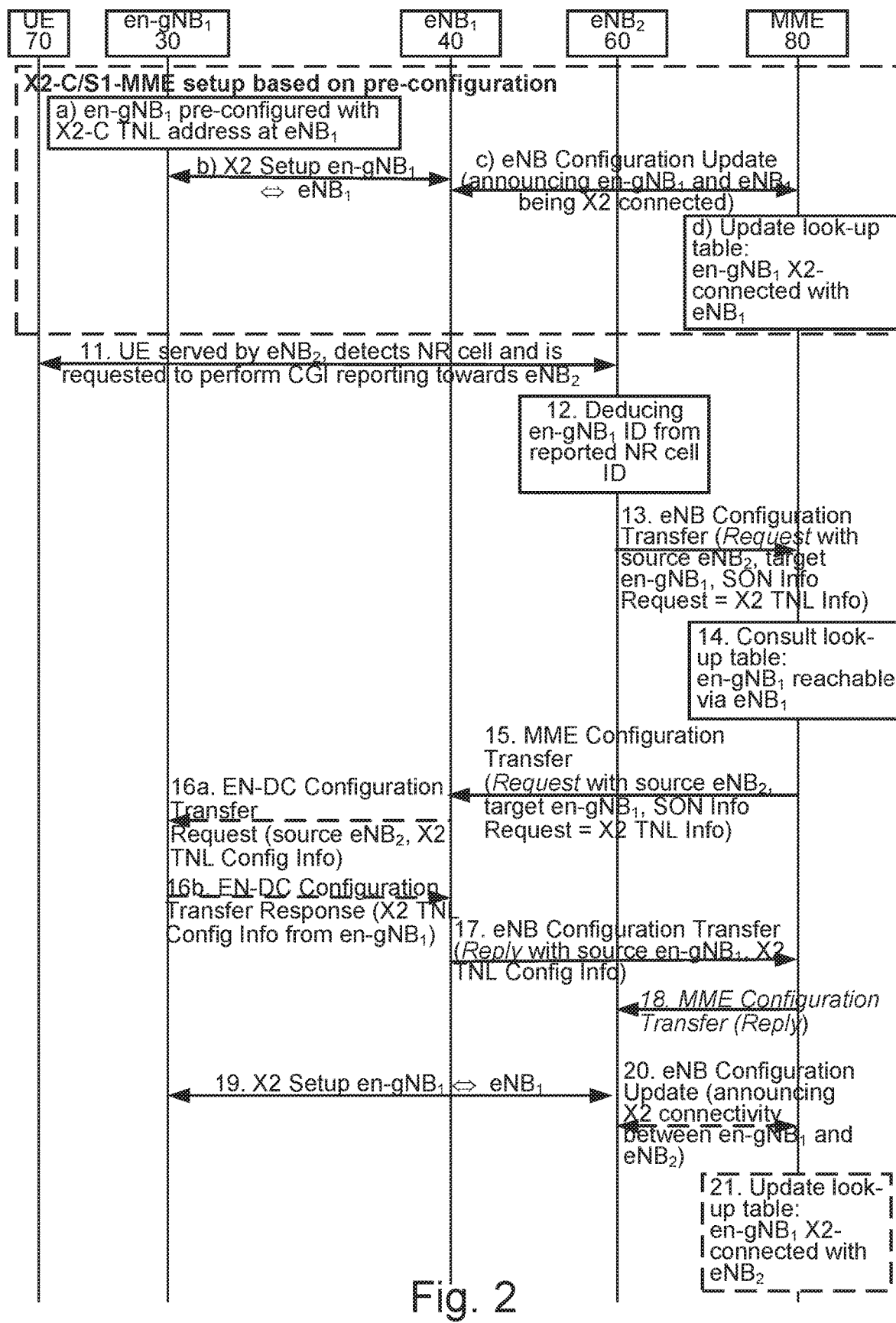
FIG. 2 illustrates the overall approach for X2 TNL address discovery for option 3.

As is appreciated from FIGS. 2 and 3, steps 910-950 performed by the MME 800, the target BS and potentially a second proxy eNB 600 illustrated in FIG. 3 are similar to steps 14-17 that are performed by the MME 80 and the target eNB 60 illustrated in FIG. 2. However, in order to ease understanding, an example embodiment of a complete process of retrieving configuration information from a target BS in an EN-DC wireless communication system 900 is now going to be described with reference to FIG. 3.

A wireless device 700, e.g. an EN-DC UE, which is connected to both a LTE cell and a NR cell may detect an unknown NR or LTE neighbouring cell at step 105. The PCI may be reported to the source en-gNB 300 at step 110. This may reported directly to the source en-gNB 300 or via the first proxy eNB 400. At step 120, the source en-gNB 300 may configure the wireless device 700 to measure the CGI and the measured CGI may thereafter be received from the wireless device 700 at step 130. The source en-gNB 300 may deduce an identifier, which identifies the target BS 500,600 from the received CGI at step 140.

At steps 150 and 210, the source en-gNB 300 may transmit an EN-DC configuration transfer request to the first proxy eNB 400. The first proxy eNB 400 may transmit, at step 220, an eNB Configuration Transfer, which comprises an EN-DC Configuration Transfer IE, to the MME 800.

The MME 800 may consult its routing table, step 910, to direct the request towards a second proxy eNB 600, if an en-gNB is the target BS. In that case, the second proxy eNB 600 acts as a proxy for the target en-gNB 500. The second proxy eNB 600 may transmit, step 930, the EN-DC Configuration Transfer Request to the target en-gNB 500. The target en-gNB 500 may collect the requested information and transmit the EN-DC Configuration Transfer Response to the second proxy eNB 600 at step 940.

In case an eNB is the target BS, the MME 800 transfers the request directly to the eNB 600 at step 920. Steps 930 and 940 can thus be skipped.

At step 950, the eNB 600 may act either as a proxy eNB or on behalf of itself and may transmit the eNB Configuration Transfer to the MME 800. The message may comprise the IP addresses for X2. At step 230 the MME 800 may transmit the MME Configuration Transfer to the first proxy eNB 400. The first proxy eNB 400 may transmit the EN-DC Configuration Transfer Response to the source en-gNB 300 at step 160 and 240.

Finally, at step 170, the source en-gNB may initiate an X2 setup using the received configuration information received from the target BS 500,600.

According to a third aspect, there is provided a source en-gNB 300 for performing the method 100 according to the first aspect.

Figure 1:
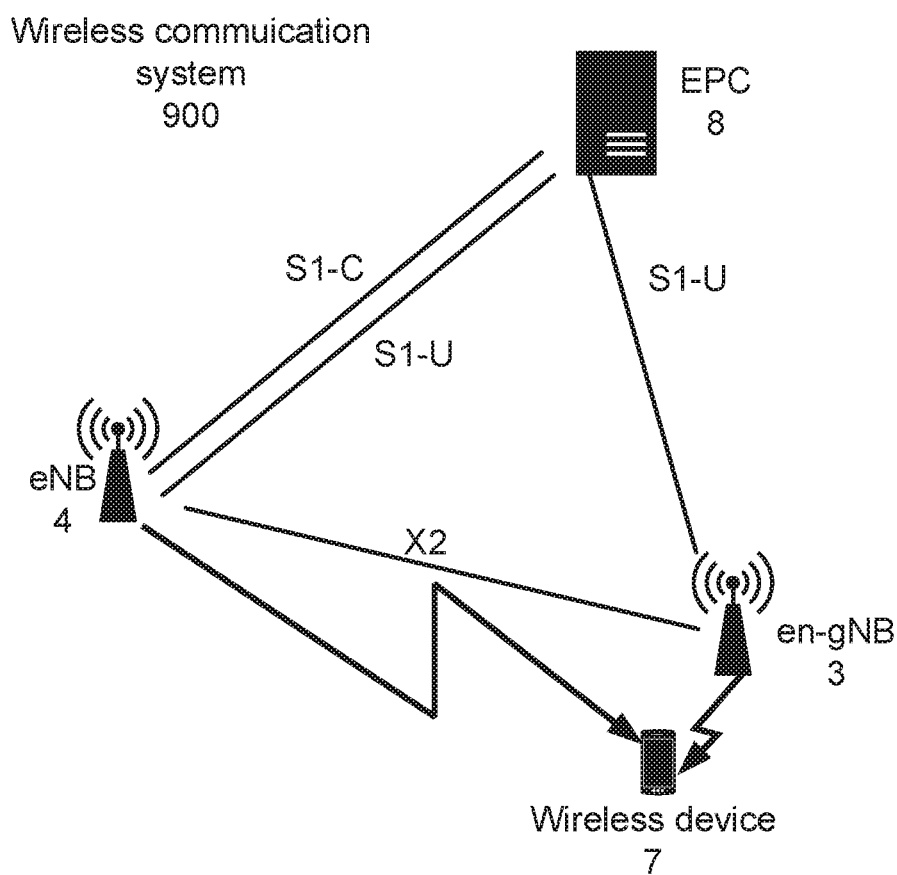
FIG. 1 shows an example of a wireless communication system.
Figure 6:
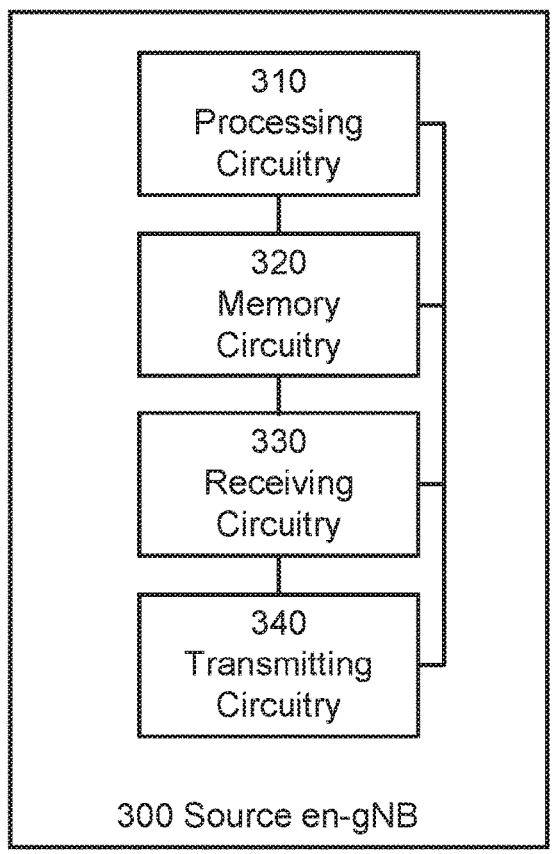
FIG. 6 shows an example implementation of a source en-gNB.

The source en-gNB 300 is now going to be described with reference to FIG. 6. The source en-gNB 300 may be used in, but are not limited to, an EN-DC wireless communication systems 900 such as illustrated in FIG. 1.

The source en-gNB 300 is configured for retrieving configuration information from a target BS in an EN-DC wireless communication system 900. As illustrated in FIG. 6, the source en-gNB comprises a processor, or a processing circuitry 310, and a memory, or a memory circuitry 320. The memory circuitry 320 storing computer program code which, when run in the processing circuitry 310, causes the source en-gNB 300 to transmit, to a first proxy eNB, a request message requesting configuration information from the target BS. The request message comprises identifiers that identify the source en-gNB 300 and the target BS, respectively. The request message may, for example, be transmitted in an EN-DC Configuration Transfer Request message.

Additionally, or alternatively, the source en-gNB 300 may further comprise a transmitter, or a transmitting circuitry 340, configured to transmit data to other apparatuses, such as the first proxy eNB.

In some embodiments, the memory circuitry 320 storing computer program code which, when run in the processing circuitry 310, may further cause the source en-gNB 300 to receive, from the first proxy eNB, a response message comprising the requested configuration information. The response message comprising the requested configuration information may, for example, be received in an EN-DC Configuration Transfer Response message.

Additionally, or alternatively, the source en-gNB 300 may further comprise a receiver, or a receiving circuitry 330, configured to receive data from other apparatuses, such as a first proxy eNB.

In some embodiments, the memory circuitry 320 storing computer program code which, when run in the processing circuitry 310, may further cause the source en-gNB 300 to initiate an X2 setup with the target BS by using the received configuration information.

In some embodiments, the configuration information may comprise X2 TNL information.

In some embodiments, the memory circuitry 320 storing computer program code which, when run in the processing circuitry 310, may further cause the source en-gNB 300 to receive a PCI reported by a wireless device 700 and to transmit, to the wireless device 700, a request to perform CGI reporting. The source en-gNB may further be caused to receive, from the wireless device 700, the requested CGI and to deduct an identifier identifying the target BS from the received CGI. The reported PCI may be received from the wireless device 700 directly or via the first proxy eNB.

According to a fourth aspect, there is provided a first proxy eNB for implementing the method according to the second aspect.

Figure 7:
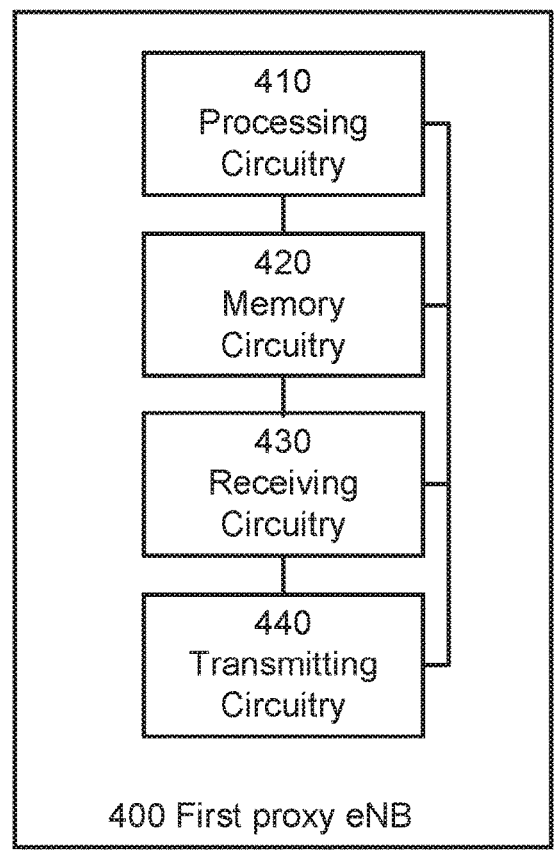
FIG. 7 shows an example implementation of a first proxy eNB.

The first proxy eNB 400 is now going to be described with reference to FIG. 7. The first proxy eNB 400 may be used in, but are not limited to, an EN-DC wireless communication systems 900 such as illustrated in FIG. 1.

The first proxy eNB 400 is configured for retrieving configuration information from a target BS 500, to a source en-gNB 300 in an EN-DC wireless communication system 900. As illustrated in FIG. 7, the first proxy eNB 400 comprises a processor, or a processing circuitry 410, and a memory, or a memory circuitry 420. The memory circuitry 420 storing computer program code which, when run in the processing circuitry 410, causes the first proxy eNB 400 to receive, from the source en-gNB 300, a request message requesting configuration information from the target BS 500. The request message comprises identifiers that identify the source en-gNB (300) and the target BS (500), respectively. The received request may, for example, be transmitted in an EN-DC Configuration Transfer Request message.

Additionally, or alternatively, the first proxy eNB 400 may further comprise a receiver, or a receiving circuitry 430, configured to receive data from other apparatuses, such as a source en-gNB 300.

In some embodiments, the memory circuitry 420 storing computer program code which, when run in the processing circuitry 410, may further cause the first proxy eNB 400 to forward, to a MME 800, the received request message requesting configuration information and to receive, from the MME 800, the requested configuration information. In some embodiments, the eNB Configuration Transfer may comprise the EN-DC SON Configuration Transfer IE as specified in Table 3.

In some embodiments, the memory circuitry 420 storing computer program code which, when run in the processing circuitry 410, may further cause the first proxy eNB 400 to forward, to the source en-gNB 300, the received configuration information. The received configuration information may, for example, be forwarded to the source en-gNB 300 in an EN-DC Configuration Transfer Response message.

In some embodiments, the configuration information may comprise X2 TNL information.

According to a fifth aspect, there is provided a computer program comprising instructions which, when executed on a processing circuitry, cause the processing circuitry to carry out the method according to the first aspect and/or the second aspect.

According to an sixth aspect, there is provided a carrier containing the computer program of the fifth aspect, wherein the carrier is one of an electronic signal, optical signal, radio signal, or computer readable storage medium.

Figure 8:
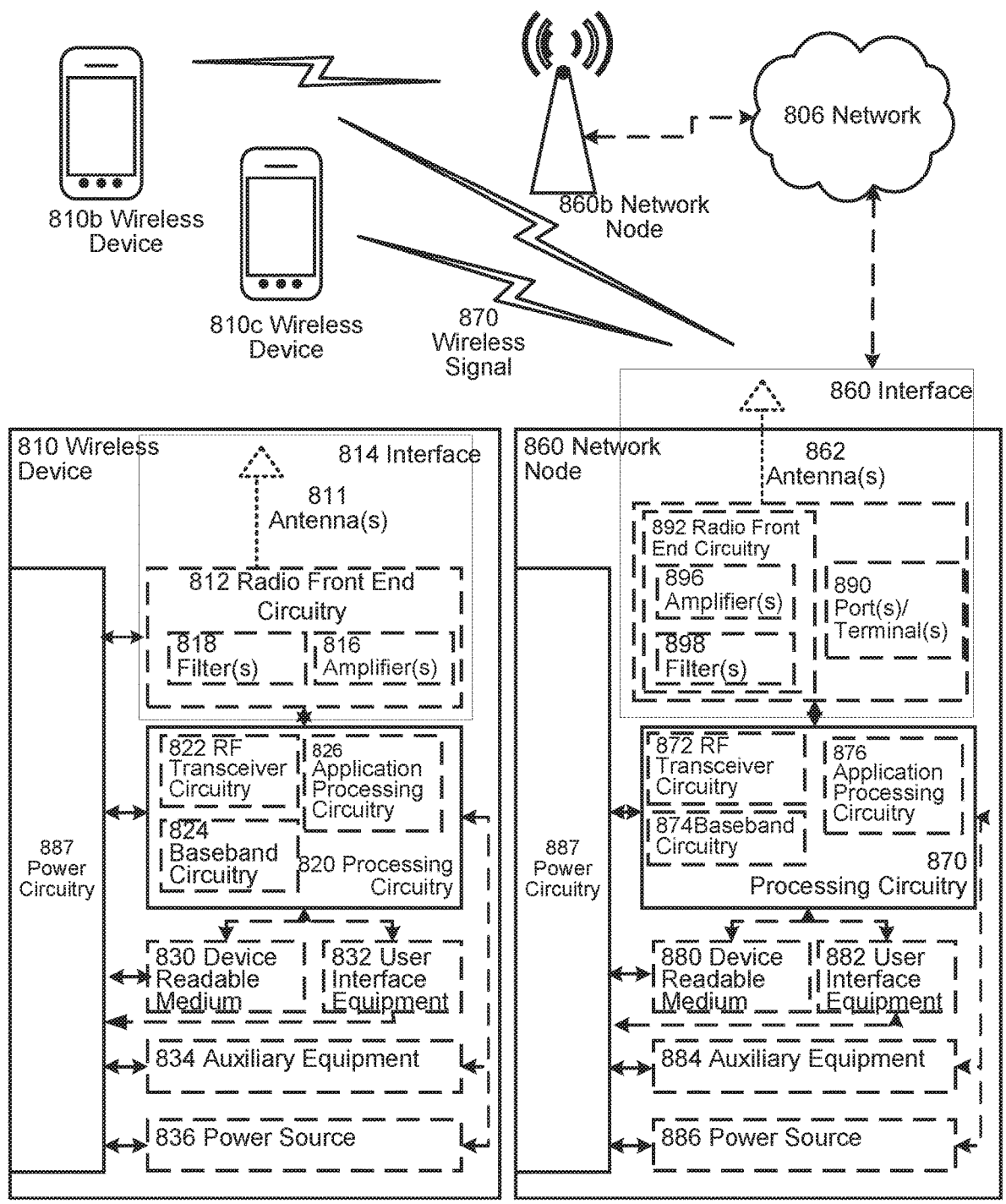
FIG. 8 illustrates an example wireless network.

Although the subject matter described herein may be implemented in any appropriate type of system using any suitable components, the embodiments described herein relate to a wireless network, such as the example wireless communication network illustrated in FIG. 8. For simplicity, the wireless communication network of FIG. 8 only depicts network 806, network nodes 860 and 860b, and Wireless Devices (WDs) 810, 810b, and 810c. The wireless communication network may further include any additional elements suitable to support communication between wireless devices or between a wireless device and another communication device, such as a landline telephone. Of the illustrated components, network node 860 and wireless device (WD) 810 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 860 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 8, Network node 860 includes processing circuitry 870, device readable medium 880, interface 890, user interface equipment 882, auxiliary equipment 884, power source 886, power circuitry 887, and antenna 862. Although network node 860 illustrated in the example wireless communication network of FIG. 8 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM. WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be provided by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 813 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 813 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may, comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments. RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, convening the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
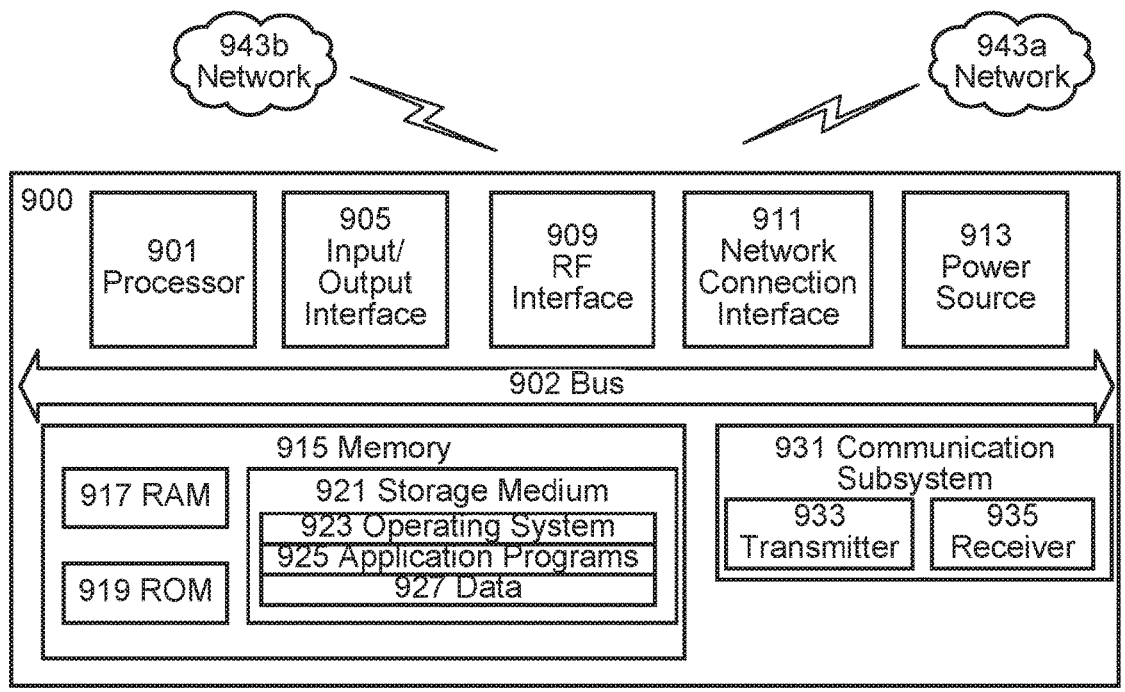
FIG. 9 shows a user equipment according to an embodiment.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3rd Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 914, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 914 may be configured to provide computer instructions or data to processing circuitry 901. For example, ROM 914 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.9. CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power 5 source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
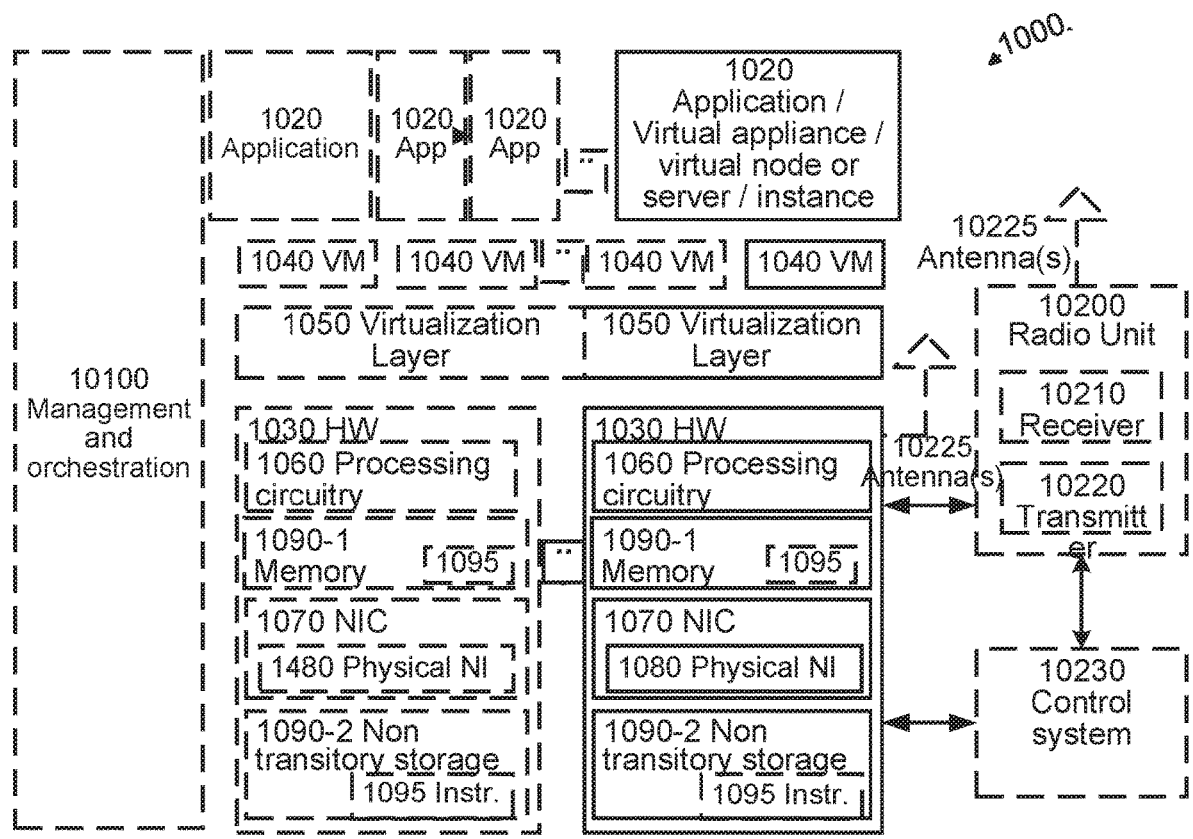
FIG. 10 shows a virtualization environment according to an embodiment.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analogue hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 10230 which may alternatively be used for communication between the hardware nodes 1030 and radio units 10200.

Figure 11:
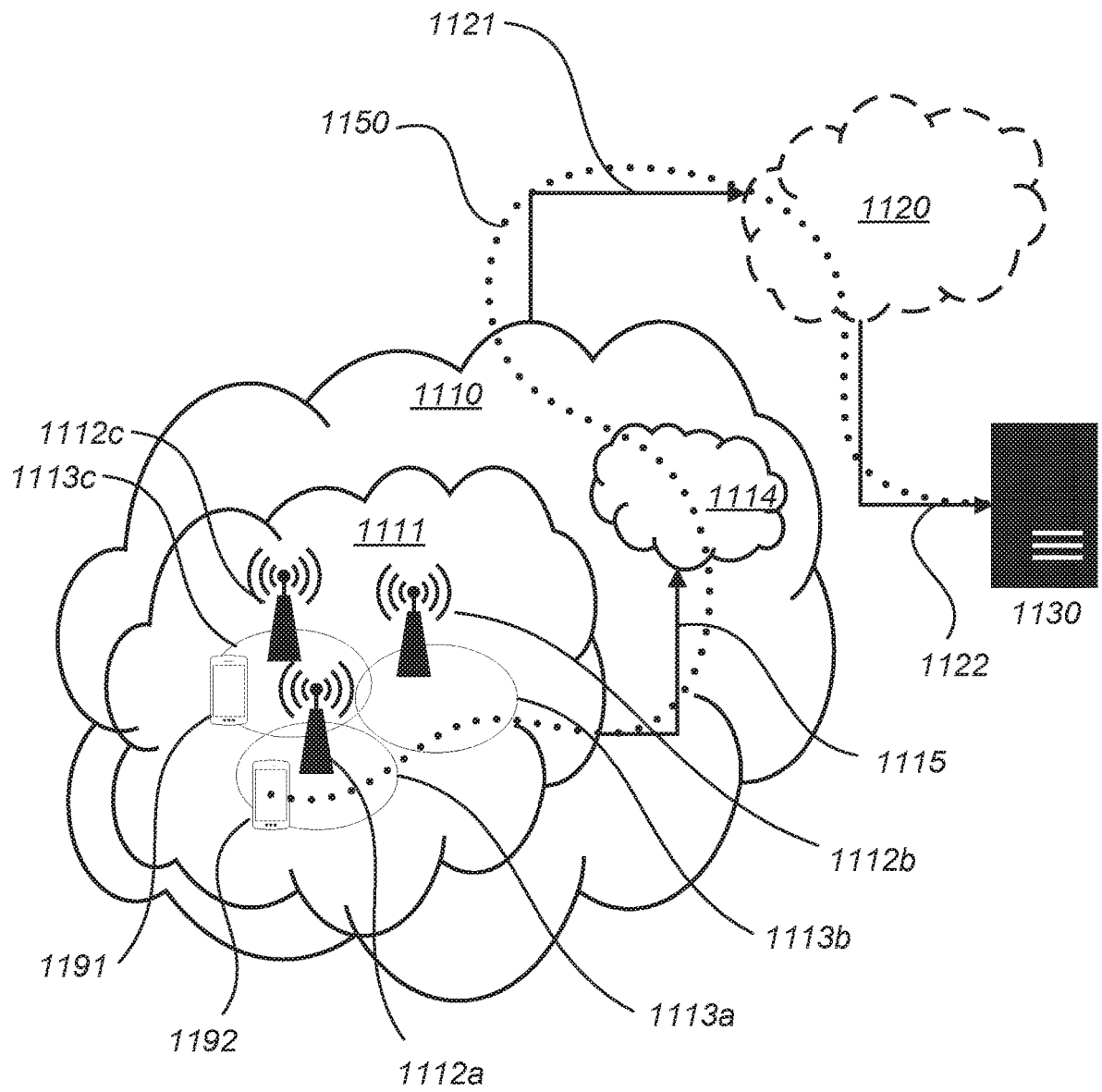
FIG. 11 illustrates an example telecommunication network connected via an intermediate network to a host computer.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a. 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1116 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct, or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
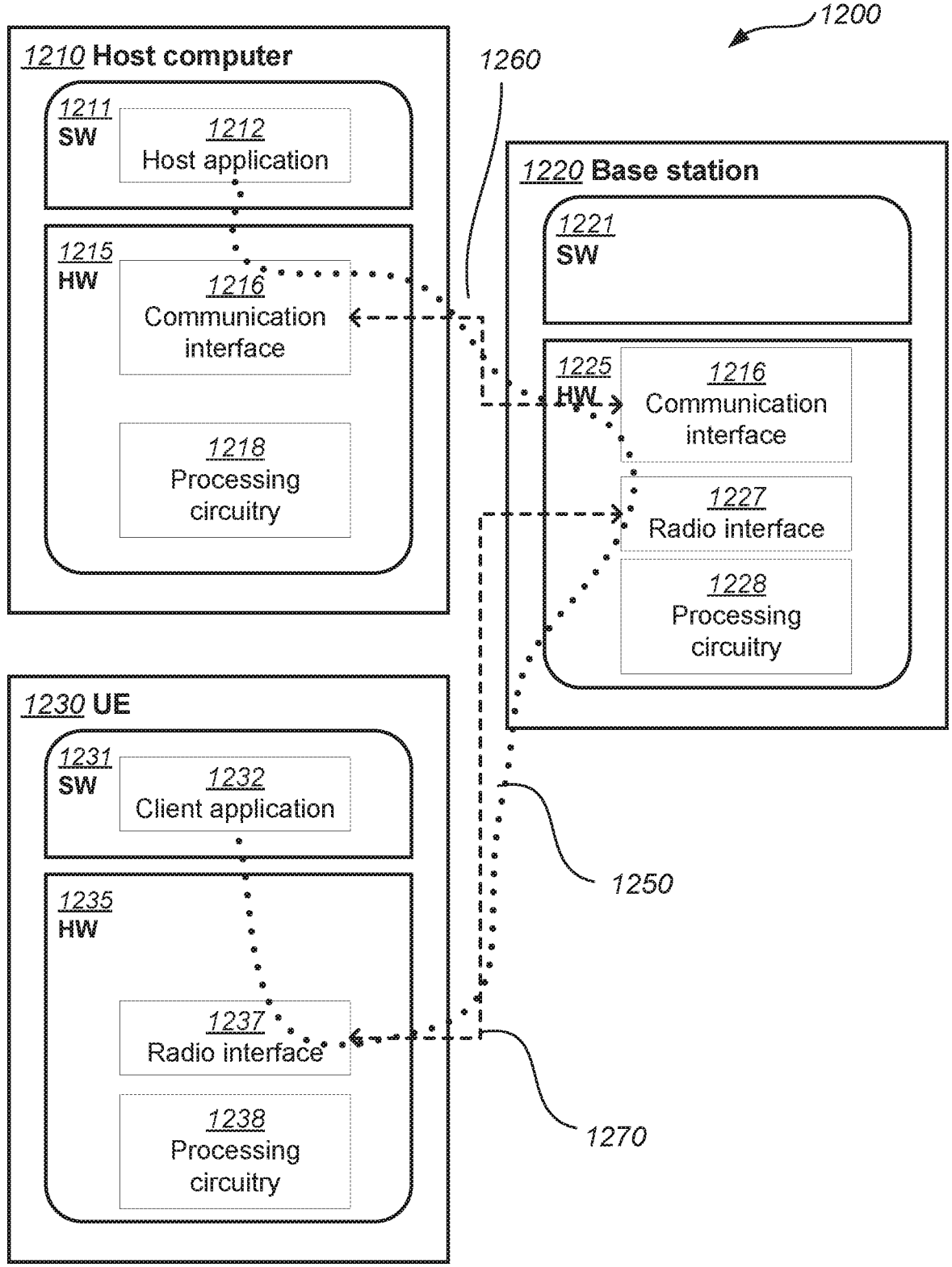
FIG. 12 shows a host computer communicating via a base station with a user equipment over a partially wireless connection according to an embodiment.

It is noted that host computer 1210, base station 1220 and UE 1230 illustrated in FIG. 12 may be similar or identical to host computer 1230, one of base stations 1512*a*, 1512*b*, 1512*c* and one of UEs 1591, 1592 of FIG. 15, respectively. This is to say, the inner workings of these entities may be as shown in FIG. 12 and independently, the surrounding network topology may be that of FIG. 15.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Numbered Embodiments in Particular Related to FIGS. 8-16

1. A source en-gNB configured to communicate with a User Equipment (UE), the source en-gNB comprising a radio interface and processing circuitry configured to:
   transmit, to a first proxy eNB, a request message requesting configuration information from a target BS, wherein the request message comprises identifiers identifying the source en-gNB and the target BS, respectively.
2. The source en-gNB according to embodiment 1, wherein the request message is transmitted in an EN-DC Configuration Transfer Request message.
3. The source en-gNB according to any of embodiment 1 and 2, wherein the source en-gNB further is configured to:
   receive, from the first proxy eNB, a response message comprising the requested configuration information.
4. The source en-gNB according to embodiment 3, wherein the response message comprising the requested configuration information is received in an EN-DC Configuration Transfer Response message.
5. The first BS according to embodiment 3 or 4, wherein the source en-gNB is further configured to:
   initiate an X2 setup with the target BS by using the received configuration information.
6. The source en-gNB according to any of embodiment 1 to 5, wherein the configuration information comprises X2 Transport Network Layer, TNL, information.
7. The source en-gNB according to any of embodiments 1 to 6, wherein the source en-gNB further is configured to:
   receive a Physical Cell Identity, PCI reported by a wireless device;
   transmit, to the wireless device, a request to perform Cell Global Identity, CGI, reporting;
   receive, from the wireless device, the requested CGI; and
   deduct an identifier identifying the target BS from the received CGI.
8. The source en-gNB according to embodiment 7, wherein the reported PCI is received from the wireless device directly or via the first proxy eNB.
9. A communication system including a host computer comprising:
   processing circuitry configured to provide user data; and
   a communication interface configured to forward the user data to a cellular network for transmission to a User Equipment (UE),
   wherein the cellular network comprises a source en-gNB having a radio interface and processing circuitry, the source en-gNB's processing circuitry configured to transmit, to a first proxy eNB, a request message requesting configuration information from a target BS, wherein the request message comprises identifiers identifying the source en-gNB and the target BS, respectively.
10. The communication system of embodiment 9, further including the source en-gNB.
11. The communication system of embodiment 10, further including the UE, wherein the UE is configured to communicate with the source en-gNB.
12. The communication system of embodiment 11, wherein:
   the processing circuitry of the host computer is configured to execute a host application, thereby providing the user data; and
   the UE comprises processing circuitry configured to execute a client application associated with the host application.
13. A method implemented in a source en-gNB, comprising
   transmitting, to a first proxy eNB, a request message requesting configuration information from a target BS, wherein the request message comprises identifiers identifying the source en-gNB and the target BS, respectively.

14. A method implemented in a communication system including a host computer, a source en-gNB and a User Equipment (UE), the method comprising:
at the host computer, providing user data; and
at the host computer, initiating a transmission carrying the user data to the UE via a cellular network comprising the source en-gNB, wherein the source en-gNB
transmitting, to a first proxy eNB, a request message requesting configuration information from a target BS, wherein the request message comprises identifiers identifying the source en-gNB and the target BS, respectively.

15. The method of embodiment 14, further comprising:
at the source en-gNB, transmitting the user data 16. The method of embodiment 15, wherein the user data is provided at the host computer by executing a host application, the method further comprising:
at the UE, executing a client application associated with the host application.

17. A User Equipment (UE) configured to communicate with a source en-gNB, the UE comprising a radio interface and processing circuitry configured to transmit and receive data to and from the source en-gNB.

18. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a source en-gNB.

19. The communication system of embodiment 18, further including the UE.

20. The communication system of embodiment 18, wherein the cellular network further includes a source en-gNB configured to communicate with the UE.

21. The communication system of embodiment 19 or 20, wherein:
the processing circuitry of the host computer is configured to execute a host application, thereby providing the user data; and
the UE's processing circuitry is configured to execute a client application associated with the host application.

22. A method implemented in a communication system including a host computer, a source en-gNB and a User Equipment (UE), the method comprising:
at the host computer, providing user data; and
at the host computer, initiating a transmission carrying the user data to the UE via a cellular network comprising the source en-gNB, wherein the UE transmits and receives to and from the source en-gNB.

23. The method of embodiment 22, further comprising:
at the UE, receiving the user data from the source en-gNB.

24. A communication system including a host computer comprising:
a communication interface configured to receive user data originating from a transmission from a User Equipment (UE) to a source en-gNB,
wherein the UE comprises a radio interface and processing circuitry, the UE's processing circuitry configured to transmit and receive data to and from the source en-gNB.

25. The communication system of embodiment 24, further including the UE.

26. The communication system of embodiment 25, further including the source en-gNB,
wherein the source en-gNB comprises a radio interface configured to communicate with the UE and a communication interface configured to forward to the host computer the user data carried by a transmission from the UE to the source en-gNB.

27. The communication system of embodiment 25 or 26, wherein:
the processing circuitry of the host computer is configured to execute a host application;
and the UE's processing circuitry is configured to execute a client application associated with the host application, thereby providing the user data.

28. The communication system of embodiment 25 or 26, wherein:
the processing circuitry of the host computer is configured to execute a host application, thereby providing request data; and
the UE's processing circuitry is configured to execute a client application associated with the host application, thereby providing the user data in response to the request data.

29. A method implemented in a User Equipment (UE), comprising transmitting and receiving data to and from a source en-gNB.

30. The method of embodiment 29, further comprising:
providing user data; and
forwarding the user data to a host computer via the transmission to the source en-gNB.

31. A method implemented in a communication system including a host computer, a source en-gNB and a User Equipment (UE), the method comprising:
at the host computer, receiving user data transmitted to the source en-gNB from the UE, wherein the UE transmitting and receiving data to and from the source en-gNB.

32. The method of embodiment 31, further comprising:
at the UE, providing the user data to the source en-gNB.

33. The method of embodiment 32, further comprising:
at the UE, executing a client application, thereby providing the user data to be transmitted; and
at the host computer, executing a host application associated with the client application.

34. The method of embodiment 33, further comprising:
at the UE, executing a client application; and
at the UE, receiving input data to the client application, the input data being provided at the host computer by executing a host application associated with the client application,
wherein the user data to be transmitted is provided by the client application in response to the input data.

35. A communication system including a host computer comprising a communication interface configured to receive user data originating from a transmission from a User Equipment (UE) to a source en-gNB, wherein the source en-gNB comprises a radio interface and processing circuitry, the source en-gNB's processing circuitry configured to transmit, to a first proxy eNB, a request message requesting configuration information from a target BS, wherein the request message comprises identifiers identifying the source en-gNB and the target BS, respectively.
36. The communication system of embodiment 35, further including the source en-gNB.
37. The communication system of embodiment 36, further including the UE, wherein the UE is configured to communicate with the source en-gNB.
38. The communication system of embodiment 37, wherein:
the processing circuitry of the host computer is configured to execute a host application;
the UE is configured to execute a client application associated with the host application, thereby providing the user data to be received by the host computer.
39. A method implemented in a communication system including a host computer, a source en-gNB and a User Equipment (UE), the method comprising:
at the host computer, receiving, from the source en-gNB, user data originating from a transmission which the source en-gNB has received from the UE, wherein the UE transmits and receives data to and from the source en-gNB.
40. The method of embodiment 39, further comprising:
at the source en-gNB, receiving the user data from the UE.
41. The method of embodiment 40, further comprising:
at the source en-gNB, initiating a transmission of the received user data to the host computer.
42. A first proxy eNB configured to communicate with a User Equipment (UE), the first proxy eNB comprising a radio interface and processing circuitry configured to:
receive, from a source en-gNB, a request message requesting configuration information from a target BS, wherein the request message comprises identifiers identifying the source en-gNB and the target BS (500), respectively.
43. The first proxy eNB according to embodiment 42, wherein the received request is transmitted in an EN-DC Configuration Transfer Request message.
44. The first proxy eNB according to any of embodiment 42 and 43, wherein the first proxy eNB further is configured to:
forward, to a Mobile Management Entity (MME), the received request message requesting configuration information; and
receive, from the MM, the requested configuration.
45. The first proxy eNB according to embodiment 44, wherein the first proxy eNB further is configured to forward, to the source en-gNB, the received configuration information.
46. The first proxy eNB according to embodiments 44, wherein the received configuration information is forwarded to the source en-gNB in an EN-DC Configuration Transfer Response message.
47. The first proxy eNB according to any of embodiments 42 to 46, wherein the configuration information comprises X2 Transport Network Layer, TNL, information.
48. A communication system including a host computer comprising:
processing circuitry configured to provide user data; and
a communication interface configured to forward the user data to a cellular network for transmission to a User Equipment (UE),
wherein the cellular network comprises a first proxy eNB having a radio interface and processing circuitry, the base station's processing circuitry configured to receive, from a source en-gNB, a request message requesting configuration information from a target BS,
wherein the request message comprises identifiers identifying the source en-gNB and the target BS, respectively.
49. The communication system of embodiment 48, further including the first proxy eNB.
50. The communication system of embodiment 49, further including the UE, wherein the UE is configured to communicate with the first proxy eNB.
51. The communication system of embodiment 50, wherein:
the processing circuitry of the host computer is configured to execute a host application, thereby providing the user data; and
the UE comprises processing circuitry configured to execute a client application associated with the host application.
52. A method implemented in a first proxy eNB, comprising
receiving, from a source en-gNB, a request message requesting configuration information from a target BS, wherein the request message comprises identifiers identifying the source en-gNB and the target BS, respectively.
53. A method implemented in a communication system including a host computer, a first proxy eNB and a User Equipment (UE), the method comprising:
at the host computer, providing user data; and
at the host computer, initiating a transmission carrying the user data to the UE via a cellular network comprising the first proxy eNB, wherein the first proxy eNB
receiving, from a source en-gNB a request message requesting configuration information from a target BS, wherein the request message comprises identifiers identifying the source en-gNB and the target BS, respectively.
54. The method of embodiment 53, further comprising:
at the first proxy eNB, transmitting the user data.
55. The method of embodiment 54, wherein the user data is provided at the host computer by executing a host application, the method further comprising:
at the UE, executing a client application associated with the host application.
56. A User Equipment (UE) configured to communicate with a first proxy eNB, the UE comprising a radio interface and processing circuitry configured to transmit and receive data to and from the first proxy eNB.
57. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a first proxy eNB.
58. The communication system of embodiment 57, further including the UE.
59. The communication system of embodiment 57, wherein the cellular network further includes a first proxy eNB configured to communicate with the UE.

60. The communication system of embodiment 58 or 59, wherein:
the processing circuitry of the host computer is configured to execute a host application, thereby providing the user data; and
the UE's processing circuitry is configured to execute a client application associated with the host application.

61. A method implemented in a communication system including a host computer, a first proxy eNB and a User Equipment (UE), the method comprising:
at the host computer, providing user data, and
at the host computer, initiating a transmission carrying the user data to the UE via a cellular network comprising first proxy eNB, wherein the UE transmits and receives to and from the first proxy eNB.

62. The method of embodiment 61, further comprising:
at the UE, receiving the user data from the first proxy eNB.

63. A communication system including a host computer comprising:
a communication interface configured to receive user data originating from a transmission from a User Equipment (UE) to a first proxy eNB,
wherein the UE comprises a radio interface and processing circuitry, the UE's processing circuitry configured to transmit and receive data to and from the first proxy eNB.

64. The communication system of embodiment 63, further including the UE.

65. The communication system of embodiment 64, further including the first proxy eNB,
wherein the first proxy eNB comprises a radio interface configured to communicate with the UE and a communication interface configured to forward to the host computer the user data carried by a transmission from the UE to the first proxy eNB.

66. The communication system of embodiment 64 or 65, wherein:
the processing circuitry of the host computer is configured to execute a host application;
and the UE's processing circuitry is configured to execute a client application associated with the host application, thereby providing the user data.

67. The communication system of embodiment 64 or 65, wherein:
the processing circuitry of the host computer is configured to execute a host application, thereby providing request data; and
the UE's processing circuitry is configured to execute a client application associated with the host application, thereby providing the user data in response to the request data.

68. A method implemented in a User Equipment (UE), comprising transmitting and receiving data to and from a first proxy eNB.

69. The method of embodiment 68, further comprising:
providing user data; and
forwarding the user data to a host computer via the transmission to the first proxy eNB.

70. A method implemented in a communication system including a host computer, a first proxy eNB and a User Equipment (UE), the method comprising:
at the host computer, receiving user data transmitted to the first proxy eNB from the UE, wherein the UE transmitting and receiving data to and from the first proxy eNB.

71. The method of embodiment 70, further comprising:
at the UE, providing the user data to the first proxy eNB.

72. The method of embodiment 71, further comprising:
at the UE, executing a client application, thereby providing the user data to be transmitted; and
at the host computer, executing a host application associated with the client application.

73. The method of embodiment 72, further comprising:
at the UE, executing a client application; and
at the UE, receiving input data to the client application, the input data being provided at the host computer by executing a host application associated with the client application,
wherein the user data to be transmitted is provided by the client application in response to the input data.

74. A communication system including a host computer comprising a communication interface configured to receive user data originating from a transmission from a User Equipment (UE) to a first proxy eNB, wherein the first proxy eNB comprises a radio interface and processing circuitry, the first proxy eNB's processing circuitry configured to receive, from a source en-gNB, a request message requesting configuration information from a target BS, wherein the request message comprises identifiers identifying the source en-gNB and the target BS (500), respectively.

75. The communication system of embodiment 74, further including the first proxy eNB.

76. The communication system of embodiment 76, further including the UE, wherein the UE is configured to communicate with the first proxy eNB.

77. The communication system of embodiment 76, wherein:
the processing circuitry of the host computer is configured to execute a host application;
the UE is configured to execute a client application associated with the host application, thereby providing the user data to be received by the host computer.

78. A method implemented in a communication system including a host computer, a first proxy eNB and a User Equipment (UE), the method comprising:
at the host computer, receiving, from the first proxy eNB, user data originating from a transmission which the first proxy eNB has received from the UE, wherein the UE transmits and receives data to and from the first proxy eNB.

79. The method of embodiment 78, further comprising:
at the first proxy eNB, receiving the user data from the UE.

80. The method of embodiment 79, further comprising:
at the first proxy eNB, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method, performed by a source en-gNB for retrieving configuration information from a target Base Station (BS) in an E-UTRA New Radio—Dual Connectivity (EN-DC) wireless communication system, the method comprising:
   identifying the target BS from signaling received from a wireless device or from another BS in the wireless communications system;
   transmitting, to a first proxy evolved Node B (eNB), a request message requesting configuration information from the target BS, wherein the request message comprises identifiers identifying the source en-gNB and the target BS, respectively;
   wherein identifying the target BS comprises:
      receiving a Physical Cell Identity (PCI) reported by the wireless device or the first proxy eNB;
      transmitting, to the wireless device, a request to perform Cell Global Identity (CGI) reporting;
      receiving, from the wireless device, the requested CGI; and
      deducing an identifier identifying the target BS from the received CGI.

2. The method according to claim 1, wherein the request message is transmitted in an EN-DC Configuration Transfer Request message.

3. The method according to claim 1, wherein the method further comprises:
   receiving, from the first proxy eNB, a response message comprising the configuration information.

4. The method according to claim 3, wherein the response message comprising the configuration information is received in an EN-DC Configuration Transfer Response message.

5. The method according to claim 3, wherein the method further comprises:
   initiating an X2 setup with the target BS by using the configuration information.

6. The method according to claim 1, wherein the configuration information comprises X2 Transport Network Layer (TNL) information.

7. A source en-gNB configured for retrieving configuration information from a target Base Station (BS) in an E-UTRA New Radio—Dual Connectivity (EN-DC) wireless communication system, the source en-gNB comprising:
   processing circuitry; and
   memory circuitry storing computer program code that, when run in the processing circuitry, causes the source en-gNB to:
      identify the target BS from signaling received from a wireless device or from another BS in the wireless communications system; and
      transmit, to a first proxy evolved Node B (eNB), a request message requesting configuration information from the target BS, wherein the request message comprises identifiers identifying the source en-gNB and the target BS, respectively;
   wherein, to identify the target BS, the memory circuitry stores computer program code that, when run in the processing circuitry, further causes the source en-gNB to:
      receive a Physical Cell Identity (PCI) reported by a wireless device or the first proxy eNB;
      transmit, to the wireless device, a request to perform Cell Global Identity (CGI) reporting;
      receive, from the wireless device, the requested CGI; and
      deduct an identifier identifying the target BS from the received CGI.

8. The source en-gNB according to claim 7, wherein the memory circuitry stores computer program code that, when run in the processing circuitry, further causes the source en-gNB to:
   receive, from the first proxy eNB, a response message comprising the configuration information.

9. The source en-gNB according to claim 8, wherein the memory circuitry stores computer program code that, when run in the processing circuitry, further causes the source en-gNB to:
   initiate an X2 setup with the target BS by using the configuration information.

* * * * *